United States Patent Office 3,418,803
Patented Dec. 31, 1968

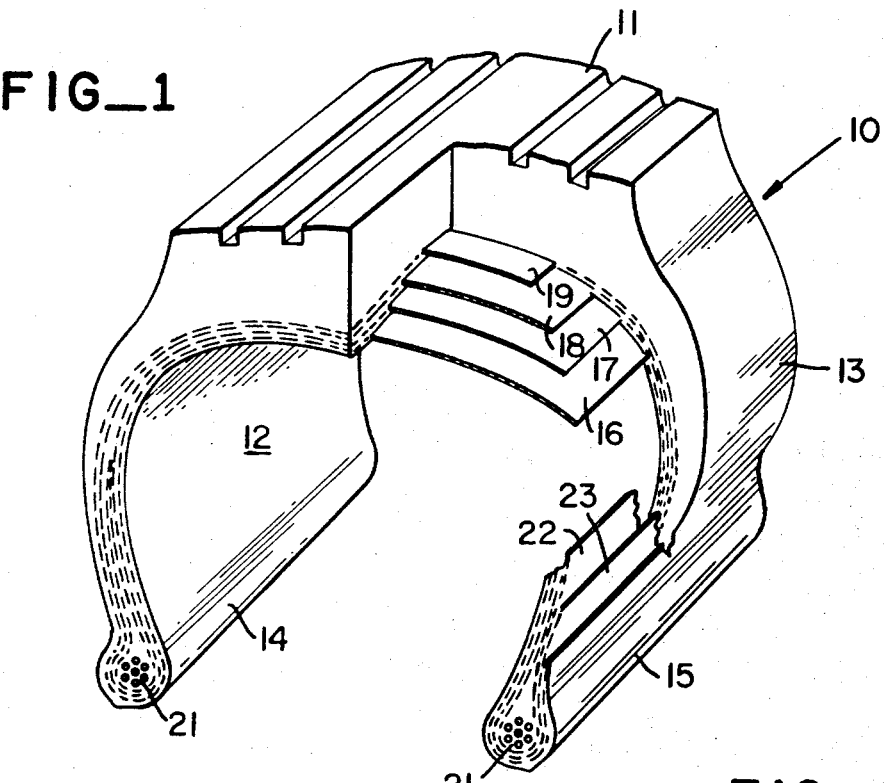
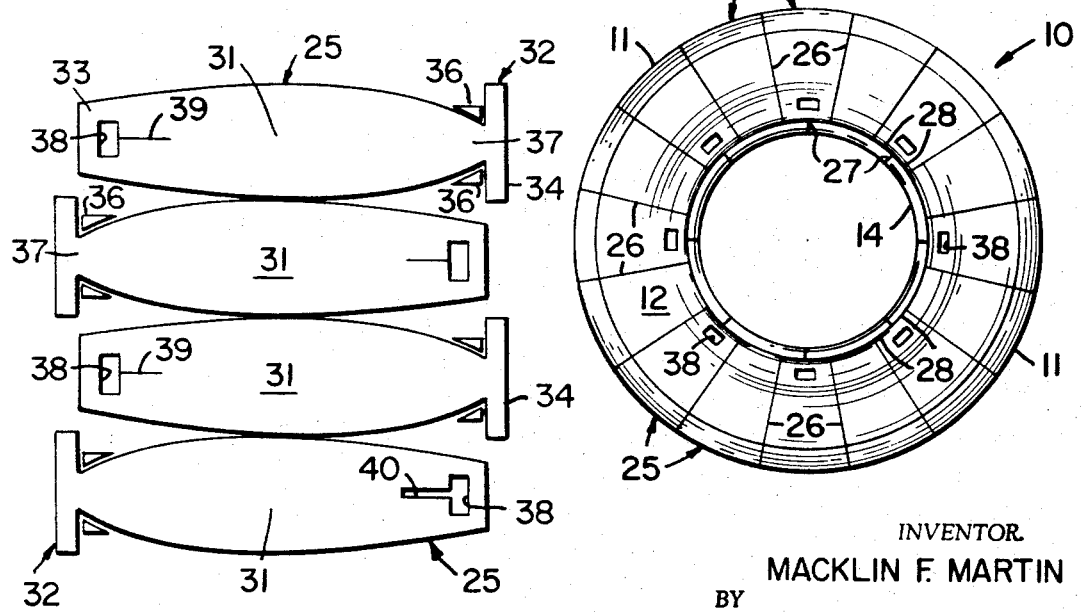

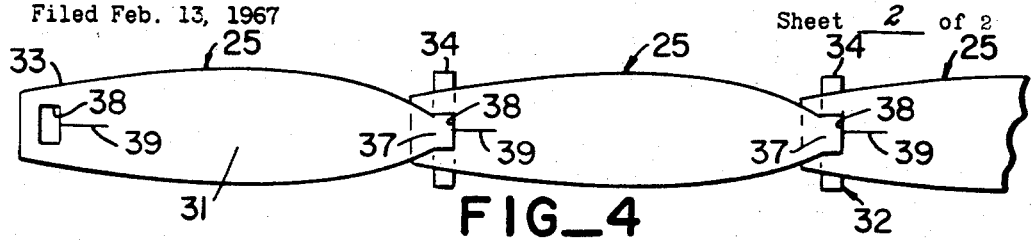
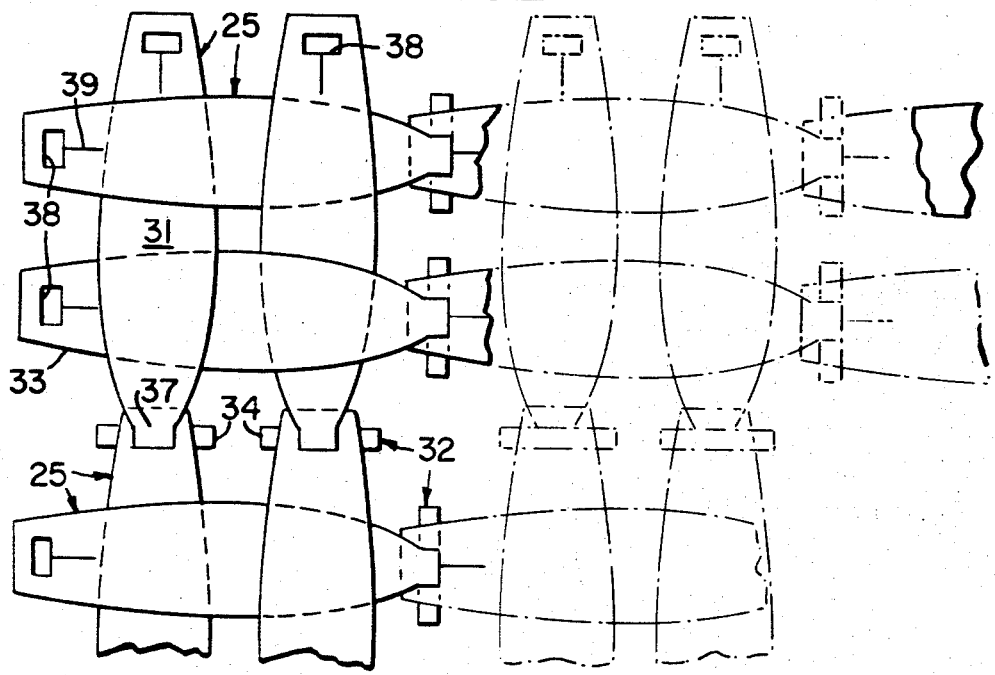
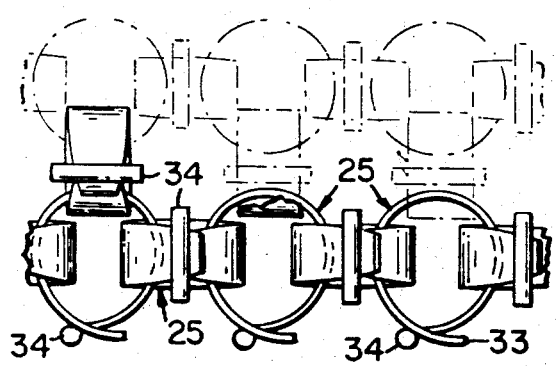
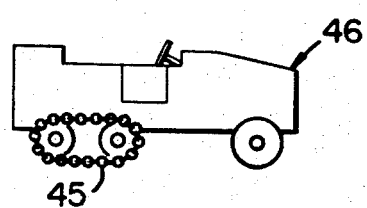

3,418,803
METHOD OF SALVAGING TIRE CARCASSES
AND ARTICLES MADE THEREFROM
Macklin F. Martin, 6025 Herzog St.,
Oakland, Calif. 94608
Filed Feb. 13, 1967, Ser. No. 615,713
8 Claims. (Cl. 59—35)

ABSTRACT OF THE DISCLOSURE

The method of salvaging tire carcasses by cutting them up completely into elongated straps, wherein the straps have a T-shaped end with the head of the T being formed from the bead portion of the carcass and wherein the straps have an opening at the other end through which the T-shaped end may be put, so that the straps may be connected together end-to-end in belt fashion, or may be made into links and connected together in chain fashion.

Background of the invention

This invention relates to tire carcasses and to a method whereby such carcasses may be completely salvaged and converted into straps which may be used for a variety of useful purposes.

At the present time, millions of automobile tires are worn out and discarded each year, a situation which presents a disposal problem of an increasingly serious magnitude. Used tires simply are not wanted. Generally, persons or companies with used tires must pay to have them hauled away. When the tires reach the dumps, the dump operators do not want them and charge to accept them. As a consequence, many people simply throw used tires away in empty lots, along roads, in creeks, or any other place they can. These discarded tire carcasses are an eyescore and remain so for prolonged periods of time, since they do not deteriorate easily. Even at a dump, tires pose a serious problem. Many municipal ordinances prohibit the burning of tire carcasses and thus they must be buried to get rid of them. Due to their shape, tires are bulky and hard to bury. Cutting of the tires, to make them less bulky, is not a desirable solution to the dump operator because of the effort and expense involved in cutting through the hardened steel beads of the carcasses.

Various chemical process have been proposed in an attempt to reclaim the rubber and steel in tire carcasses, but to applicant's knowledge no solution has been entirely satisfactory. In any event, such attempts have certainly not alleviated to any great extent the problem of what to do with the myriads of tires that must be disposed of each year.

Applicant believes that the major reason that the disposal of tire carcasses is such a problem is that no one has been able to devise a way in which such tires could be salvaged and turned easily into useful products, due to the peculiar shape of a tire and to the particular combination of materials used in a tire construction, namely, the rubber, fabric plies and steel beads.

Summary of the invention

Applicant has discovered that the particular shape and construction of a tire carcass, instead of being a detriment, can be utilized to advantage in the production of very strong straps which may be interconnected to form belts, mats, chains, and the like, and wherein the characteristics of the individual components of the tire carcass may be capitalized upon.

Applicant has also discovered that tire carcasses may be formed into such straps in such a way that substantially the entire carcass may be utilized, with extremely little wastage to be discarded.

Other objects and advantages will be apparent in the course of the following detailed description.

Brief description of the drawings

In the drawings, forming a part of this application, and in which like parts are designated by like reference numerals throughout the same:

FIG. 1 is a cutaway view of a conventional tire carcass, showing the construction features thereof.

FIG. 2 is a side view of a tire carcass showing the cuts to be made thereon in order to convert the carcass into straps in accordance with the invention.

FIG. 3 is a diagrammatic view of the straps which are produced from a tire carcass, which straps are shown in flattened-out position.

FIG. 4 illustrates the manner in which straps made in accordance with the invention may be connected together in belt fashion.

FIG. 5 illustrates the manner in which such straps may be connected together into belts, with the belts being interwoven into a mat.

FIG. 6 illustrates the manner in which such straps may be connected together in chain fashion.

FIG. 7 is a diagrammatic illustration of a half-track vehicle utilizing such straps connected in endless-chain fashion to form the tracks of the vehicle.

Referring now to the drawings, FIG. 1 illustrates a conventional tire carcass 10, which has a crown, or tread, portion 11, sidewalls 12 and 13, and bead portions 14 and 15. In a conventional four-ply tire there will be four layers of fabric 16, 17, 18 and 19 in the sidewalls and crown, which layers extend into the bead portions of the tire and pass around the steel beads 21. To provide extra strength at the point where the sidewalls join the bead portions, an extra piece of fabric is inserted which passes around the steel beads and has two ply portions 22 and 23 extending up into the sidewalls. Thus, at the junction of the sidewalls and bead portions, the carcass has six plies of fabric.

FIG. 2 illustrates the manner in which a tire carcass 10 may be cut into straps 25. The carcass is cut at spaced points around the circumference, such cuts 26 being generally radial of the carcass and being through the crown and sidewalls of the tire but not to the bead portions of the carcass. Such cuts 26 form the carcass into straps which are connected together at their ends by the bead portions of the carcass. On one side of the carcass the bead portion is cut at 27 generally intermediate of alternate straps. Similarly, the other side of the carcass has its bead portion cut generally intermediate of alternate straps, with such cuts being staggered with relation to the cuts 27 on the first side. The cuts 27 on each side of the carcass are then extended as at 28 in both directions through the sidewall portions immeditely adjacent the bead portions to the radial cuts 26. Such cutting thus provides a plurality of straps 25 which completely use up the tire carcass. FIG. 3 illustrates a portion of the carcass showing how the straps so formed would appear if flattened out. As will be noticed, the straps 25 are widest at their middle portions 31 where they are formed from the crown of the carcass, and are narrower towards their ends 32 and 33, where formed from the sidewalls of the carcass. One end 32 of the strap is T-shaped, the head 34 of the T being formed from a section of the steel bead-reinforced bead portion, while the other end 33 terminates at the portion of the sidewall immediately adjacent the bead portion.

To complete the strap, the end 32 of the strap is cut away, forming the scrap pieces 36, so that the leg 37 of the T-shaped end is relatively narrow in width adjacent the head 34 of the T. The end 33 of the strap is cut to provide it with an opening 38 therethrough of a width sufficient to receive the leg 37 of the T-shaped end. The strap is cut, as, for example, at 39 or 40, from the opening 38 towards the middle of the strap so that the head 34 of the T-shaped end may be inserted through the strap.

In thus forming the straps 25, the only wastage is the scrap pieces 36 and the pieces cut from the straps to form the openings 38, which pieces are easily disposed of.

The straps 25 thus formed may be used for a variety of useful purposes. One example of such use is illustrated in FIG. 4, wherein a plurality of such straps are connected end-to-end to form a belt, with the T-shaped end inserted through the opening 38 in the next adjacent strap. Such a belt can be used for towing or hoisting or for any other such purpose.

The straps 25 have unique advantages in such use when the belt thus formed is put in tension. The hardened steel beads in the heads of the T-shaped ends reinforce the heads so that they will not collapse and pull through the openings 38. The narrowest portion of the strap end 32 is the narrowed leg 37 of the T, and hence the strap would normally be quite weak at that point. However, the carcass is reniforced at this point by the extra plies 22 and 23 in the carcass. Also, the sidewall rubber of the carcass at this point will be still substantially intact even though the tread portion is worn, and the sidewall rubber will add strength. The mid-portion of the strap has fewer plies and during use of the tire the rubber, and perhaps one of the plies, may have worn away. However, the strap is wider at the mid-portion and thus the tension will be distributed over a relatively great cross-sectional area. The opening 38 will weaken end 33 of the strap, but such opening will be in the stronger portion of the carcass adjacent the bead portion, and thus this end will be reinforced by the extra plies.

As illustrated in FIG. 5, the straps may be connected together end-to-end in belt form and the belts may be interwoven to form a mat. If all of the heads of the T-shaped ends are underneath the mat the upper surface of the mat will be relatively smooth. If desired, such a mat could be used to make a low-cost trampoline for recreational areas.

Such a mat could also be used as a ground cover for wet ground. If the mat were big enough it could be used as a landing strip for small aircraft. In such uses the heads of the T-shaped ends underneath the mat would be very advantageous, since they would embed themselves in the ground and serve as cleats to prevent the mat from slipping along the ground.

This resistance to slipping, because of the cleat action, would also make a small mat or belt very useful in moving vehicles that are stuck in the mud, since such a belt could be easily inserted beneath the stuck wheels. The rubber-to-rubber friction between the wheels of the vehicle and the mat, and the cleat action of the mat to the mud, would enable the vehicle to free itself easily.

FIG. 6 illustrates the manner in which the straps 25 may be connected together in chain fashion. Each strap has its T-shaped end inserted through the opening in the other end to form a link, with the links being then connected together to form a chain.

Such a chain could be used for towing or hoisting purposes, and would be considerably stronger than a belt formed from such straps.

As suggested by the dotted lines in FIG. 6, the links could also be connected together in both directions horizontally to form mats for ground-covering purposes. In addition, the links could be connected together both horizontally and vertically to build whatever block-type structures might be desired.

FIG. 7 illustrates a manner in which a chain of such links could be used as tracks 45 for a half-track vehicle 46. In such an instance a chain formed as in FIG. 6 would be made long enough to serve as a track, and one end of the chain would be connected to the other so that an endless chain is formed. If the chain is formed as in FIG. 6 so that all of the heads of the T-shaped ends are on the exterior of the chain so formed, the horizontally disposed heads 34 of the T's, as well as the projecting (and reinforced) other ends 33, which are on the bottom of the chain, or track, will serve as ground-engaging cleats. The vertically disposed heads 34 of the T's, on alternate links, which are reinforced by the steel beads therein, will aid in resisting downward compression of the track.

The above illustrates merely some of the uses to which straps 25 may be put.

Applicant recognizes that many of the uses to which the present invention may be put may be accomplished by existing devices. For example, a sufficiently strong rope can serve just as well as a towing means. However, the present invention is one which takes an article, namely a tire carcass, which no one wants and indeed no one knowns what to do with it, and converts this carcass into a new article which has usefulness. Applicant further realizes that such new articles will probably not replace existing articles to any significant extent. However, with the raw materials (tire carcasses) being free, it is believed that the straps made therefrom will be of great value. This would particularly be true with underdeveloped areas, both in this country and abroad, wherein the value of labor is sufficiently low that the labor involved in assembling these inexpensive straps together would enable farmers, and the like, to use the present invention in place of conventional articles which they otherwise could not afford.

Further, and importantly, the present invention will solve, to whatever degree of use to which it is put, the presently existing problem of satisfactory tire carcass disposal. In this regard, when the straps of the present invention finally lose their utility, they are much more easily disposed of because they are much less bulky than a tire carcass and are much more easily compacted.

It is to be realized that the embodiment of the invention herein shown and described is to be taken as a preferred embodiment of the method and article made thereby, and that various changes may be made in the method and in the shape and size of the article without departing from the spirit of the invention or the scope of the attached claims.

Having thus described my invention, I claim:

1. A strap formed from a section of a tire carcass, said strap having a T-shaped end, the head of the T being formed from a section of the bead portion of the tire carcass, the neck of said T being relatively narrow in width and being formed from a portion of the sidewall of said carcass adjacent said bead portion, the body of said strap being formed from portions of the sidewalls and crown of said carcass, and the opposite end of said strap having an opening therethrough of a width sufficient to receive therethrough said relatively narrow portion of said neck.

2. A strap as set forth in claim 1 wherein the mid-portion of said strap is wider than the ends thereof.

3. A strap as set forth in claim 1 wherein said strap is cut from said opening towards said middle of the strap sufficiently to enable said head of the T to be passed therethrough.

4. A strap as set forth in claim 1 wherein the portions of said strap surrounding said opening are formed from the portion of the sidewall of said carcass wherein the piles of said carcass are more numerous than in the crown of said carcass.

5. A plurality of straps as set forth in claim 1, said straps being connected together in belt fashion with the head of the T-shaped end of one strap being received through the opening in the next strap.

6. A plurality of straps as set forth in claim 1, said straps being connected together in chain fashion, with the head of the T-shaped end of each strap being received through the opening in the other end thereof to form a link.

7. A plurality of straps connected together as in claim 6, wherein said links have the head of the T-shaped end on the exterior of said link, and wherein said heads of the T-shaped ends of said straps are on the exterior surface of the chain formed by said links.

8. The method of salvaging a tire carcass comprising:
(a) forming a plurality of cuts around said carcass and through the crown and sidewalls of said carcass, said cuts being generally radial of said carcass and severing said carcass into a plurality of straps,
(b) cutting through the bead portions on each side of said carcass at points generally intermediate alternate of said straps, the cuts through the bead portions on one side being staggered with relation to such cuts on the other side of the carcass,
(c) extending each cut through said bead portions along said bead portions in each direction to join with the two nearest radial strap-forming cuts.

References Cited
FOREIGN PATENTS

| | | |
|---|---|---|
| 10,491 | 7/1916 | Great Britain. |
| 104,644 | 3/1917 | Great Britain. |

CHARLES W. LANHAM, *Primary Examiner.*

G. P. CROSBY, *Assistant Examiner.*

U.S. Cl. X.R.

59—78, 80, 90